I. SLOPER.
MOLD FOR MANUFACTURE OF RUBBER THREAD LOOPS.
APPLICATION FILED OCT. 9, 1915.

1,198,874.

Patented Sept. 19, 1916.
2 SHEETS—SHEET 2.

Witnesses
Inventor

UNITED STATES PATENT OFFICE.

THOMAS SLOPER, OF DEVIZES, ENGLAND.

MOLD FOR MANUFACTURE OF RUBBER THREAD-LOOPS.

1,198,874.   Specification of Letters Patent.   Patented Sept. 19, 1916.

Application filed October 9, 1915. Serial No. 55,104.

*To all whom it may concern:*

Be it known that I, THOMAS SLOPER, a subject of the King of England, residing at Devizes, in Wiltshire, England, have invented certain new and useful Improvements in Molds for the Manufacture of Rubber Thread-Loops, of which the following is a specification.

This invention is for a mold for use in the manufacture of strain insulators. These insulators as used for aerials have heretofore been built up by winding rubbered thread (usually in the form of cord) on a "former" in an elongated loop, the threads being pressed together by hand so that they adhered one to another, removing the loop thus built up from the "former", and collapsing the sides together without closing the ends so that eyes were formed at the ends to receive thimbles or other fastening means. The insulator thus built up was then lashed at its ends and finally coated with rubber and vulcanized. It has been found that in making up such insulators, the threads although laid parallel to each other when winding them on the "former", often got displaced during the further steps in the manufacture, so that the resulting insulator was weakened in that all the threads did not take their proper proportion of the strain.

The present invention provides a mold whereby the threads may be pressed together without being displaced out of their proper relative positions, and which may be used in the process set forth in my concurrent United States patent application Serial No. 18324, filed March 31, 1915.

Figure 1:
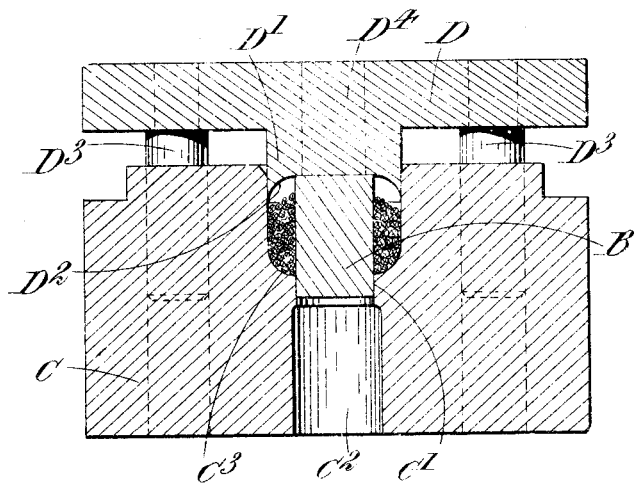
Figure 3:
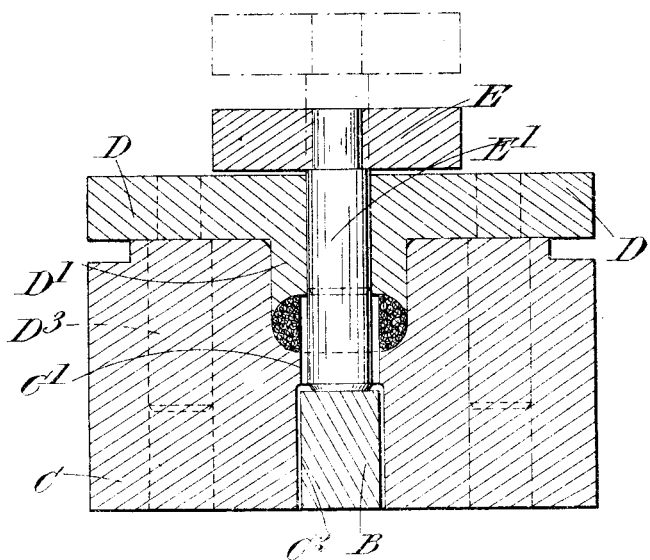
Figure 2:
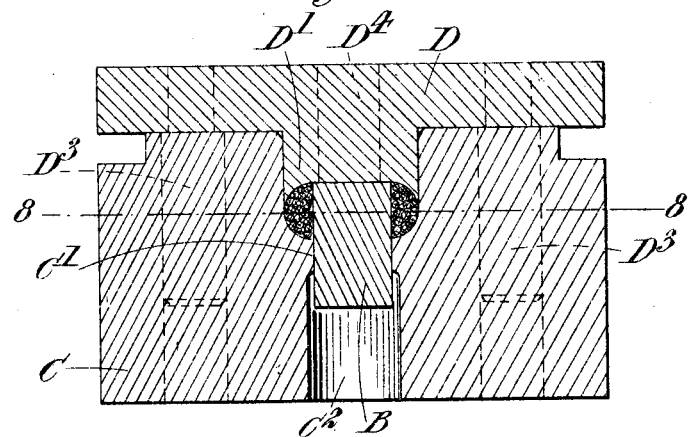
Figure 4:
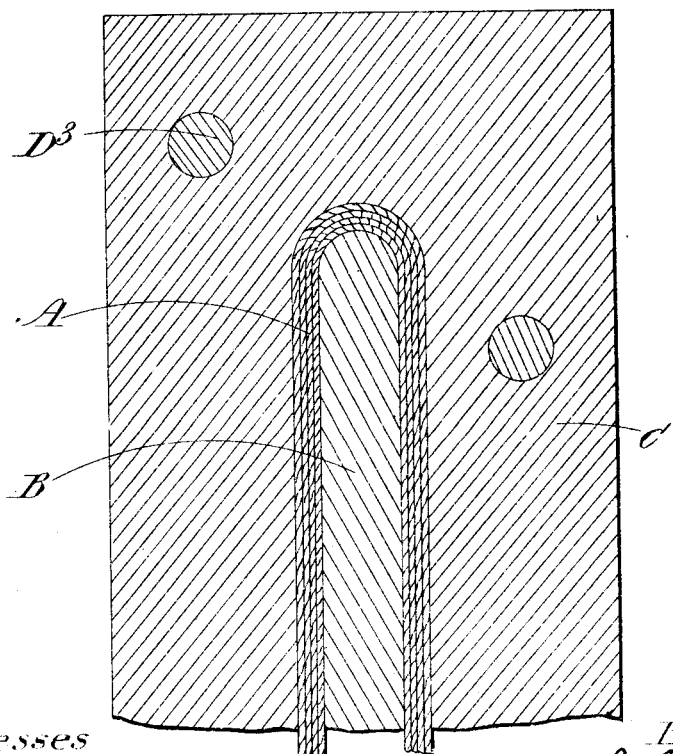

In the accompanying drawings:—Figure 1 is a transverse section through a mold constructed according to this invention; Fig. 2 shows the same section as Fig. 1 but with the parts in a different position; Fig. 3 shows a section similar to Fig. 1, but in a different plane, with the parts in yet another position and a further element added, and Fig. 4 is a section on the line 8—8 of Fig. 2.

The same letters indicate the same parts throughout the drawings.

In building up the insulators, rubbered threads A, such as are well-known from their use in the manufacture of Palmer cord tires, are first wound upon a "former" B, Figs. 1-4, which "former" in shape resembles a rectangular bar having rounded ends, and the thread is so wound upon it as to constitute when removed from the "former" an elongated loop, as can be seen by reference to Figs. 1-4. The threads are laid parallel to each other and in laying them as even a tension as possible is maintained throughout. The rubbered thread, as is known, is tacky, so that when laid together the coils will adhere to some extent to one another, but it has been found that pressing them together by hand does not cause them to adhere to one another sufficiently to prevent derangement during their removal from the "former" or during their subsequent treatment. To cause them to adhere firmly to one another, the mold shown in Figs. 1-4 is therefore employed. This mold comprises a base-die C and a coöperating die D. The base-die is provided with a through slot which at $C^1$ is made to fit the "former" B but below this the slot is enlarged as shown at $C^2$. The upper face of the die C is recessed about the slot at $C^3$, the bottom part of this recess being made of such size and shape as to correspond to the size and shape the lower half of the loop of thread A is required to take when compressed by the dies while still on the "former".

The upper die D has a tongue $D^1$ which enters the recess $C^3$ and has its lower face $D^2$ shaped to correspond to the size and form the upper half of the loop of thread A is required to take. The die D is conveniently guided in the die C by pins $D^3$ and may be connected to the movable member of a press, or it may be operated merely by striking it.

The thread A is conveniently wound on the middle portion of the "former" B so that the "former" projects both above and below the loop as shown in Fig. 1. It follows therefore that as the die D is forced home, it first drives the "former" B partially through the loop and then compresses the thead so that the parts finally take the position shown in Fig. 2.

The die D is provided with two or more perforations $D^4$ which extend from its upper face through the tongue $D^1$ so that a driver comprising a plate E and having two or more pins $E^1$ which register with and slide through the perforations $D^4$ can be employed to discharge the "former" B from the loop.

It will be appreciated that if the "former" and loop were taken out of the dies and then the loop removed by pulling it from the "former", the threads might get displaced, whereas if the "former" is thrust out of the loop by forcing the driver E downward until the pins E¹ drive the "former" right through the loop into the enlargement C² of the through-way slot in the die C, the threads are held meanwhile by the dies so that they cannot be displaced relatively to one another.

In Fig. 3, the driver is shown as having been advanced and the "former" B is shown lying in the enlargement C² of the slot in the die C. This enlargement is conveniently made of sufficient depth to accommodate the "former" so that the dies may stand upon a flat surface if desired, while the "former" is being thrust out, and the "former" will then be found quite loose in the bottom of the die C. The driver E is conveniently operated in the same press as is employed for consolidating the core.

The loop of thread A after compression in the manner above described in the press tool is removed therefrom and formed into a strain insulator in the manner described in my concurrent United States application hereinabove referred to.

What I claim as my invention and desire to secure by Letters Patent is:—

In a mold for shaping rubber thread loops, the combination of, a die slotted to receive the "former" whereon the loop is placed and recessed about the slot in one face to receive the loop on the "former" said slot being made to fit the "former" at the recess and the recess being shaped to correspond to the form the exterior of one half of the loop is to take while on the "former", a coöperating die having a face which registers with the recess in the first-mentioned die, said face being shaped to the form the exterior of the second half of the loop is required to take while on the "former", and being provided with an orifice opposite the face of the "former" opposed to the second die, which orifice is of sufficient dimensions to admit a discharge-member whereby the "former" may be forced out of the loop while the latter is still held between the dies in their closed position.

In testimony whereof I have signed my name to this specification in the presence of two subscribing witnesses.

THOMAS SLOPER.

Witnesses:
HAROLD PARSONS,
ROBERT CANTWELL.